United States Patent
Wright et al.

(10) Patent No.: US 9,511,708 B2
(45) Date of Patent: Dec. 6, 2016

(54) METHOD AND SYSTEM FOR IMAGING AN EXTERNAL SCENE BY EMPLOYING A CUSTOM IMAGE SENSOR

(71) Applicant: Gentex Corporation, Zeeland, MI (US)

(72) Inventors: David J. Wright, Grand Rapids, MI (US); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 593 days.

(21) Appl. No.: 13/967,933

(22) Filed: Aug. 15, 2013

(65) Prior Publication Data

US 2014/0049645 A1  Feb. 20, 2014

Related U.S. Application Data (60) Provisional application No. 61/742,680, filed on Aug. 16, 2012.

(51) Int. Cl.
| | |
|---|---|
| *B60Q 1/14* | (2006.01) |
| *G06K 9/00* | (2006.01) |
| *G06K 9/20* | (2006.01) |

(52) U.S. Cl.
CPC ......... *B60Q 1/1423* (2013.01); *G06K 9/00825* (2013.01); *G06K 9/209* (2013.01)

(58) Field of Classification Search
None
See application file for complete search history.

(56) References Cited

U.S. PATENT DOCUMENTS

| | | |
|---|---|---|
| 5,251,019 A | 10/1993 | Moorman et al. |
| 5,426,294 A | 6/1995 | Kobayashi et al. |
| 5,629,734 A | 5/1997 | Hamilton, Jr. et al. |
| 5,796,094 A | 8/1998 | Schofield et al. |
| 5,837,994 A | 11/1998 | Stam et al. |
| 6,429,594 B1 | 8/2002 | Stam et al. |
| 6,653,615 B2 | 11/2003 | Bechtel et al. |

(Continued)

FOREIGN PATENT DOCUMENTS

WO  2004011890  2/2004

OTHER PUBLICATIONS

Patent Cooperation Treaty, International Searching Authority, International Search Report, Written Opinion of the International Searching Authority and Notification of Transmittal, Nov. 14, 2013, 6 Pages.

(Continued)

*Primary Examiner* — Sath V Perungavoor
*Assistant Examiner* — Janese Duley
(74) *Attorney, Agent, or Firm* — Price Heneveld LLP; Bradley D. Johnson (57) ABSTRACT

A method and system are provided to image an external scene by employing a custom image sensor. The custom image sensor may use a GRRB array to filter the images of oncoming and preceding vehicle taillights captured by a vehicle camera. The method and system may also calculate a GRRB color metric for use in the custom image sensor by performing interpolation on a number of color channels, summing the brightness values for each of the color channels interpolated, normalizing each of the brightness values, and converting the normalized brightness values from an RGB scale to a linear scale of non-red to red.

20 Claims, 6 Drawing Sheets

(56) References Cited

U.S. PATENT DOCUMENTS

| | | |
|---|---|---|
| 6,774,988 B2 | 8/2004 | Stam et al. |
| 6,836,289 B2 | 12/2004 | Koshiba et al. |
| 7,006,686 B2 | 2/2006 | Hunter et al. |
| 7,385,680 B2 | 6/2008 | Tamaki et al. |
| 7,609,302 B2 | 10/2009 | Jerdev et al. |
| 7,710,437 B2 | 5/2010 | Kang |
| 8,004,575 B2 | 8/2011 | Justiss et al. |
| 8,065,053 B2 | 11/2011 | Stam et al. |
| 8,350,934 B2 | 1/2013 | Chao et al. |
| 2004/0021853 A1* | 2/2004 | Stam .................... B60Q 1/1423 356/218 |
| 2005/0052666 A1* | 3/2005 | Yamamoto ............... H04N 1/54 358/1.9 |
| 2009/0087087 A1 | 4/2009 | Palum et al. |
| 2010/0128149 A1 | 5/2010 | Kim et al. |
| 2010/0172542 A1 | 7/2010 | Stein et al. |
| 2012/0050074 A1* | 3/2012 | Bechtel .................... B60R 1/04 340/988 |

OTHER PUBLICATIONS

Connell, J.H., Herta, B.W., Pankanti, S. Hess, H. Pliefke, S. A fast and robust intelligent headlight controller for vehicles, Intelligent Vehicles Symposium (IV), 2011 IEEE, pp. 703-708, Jun. 5-9, 2011.

* cited by examiner

METHOD AND SYSTEM FOR IMAGING AN EXTERNAL SCENE BY EMPLOYING A CUSTOM IMAGE SENSOR

CROSS REFERENCE TO RELATED APPLICATION

This application claims priority to and the benefit under 35 U.S.C. §119(e) of U.S. Provisional Patent Application No. 61/742,680, filed on Aug. 16, 2012, entitled "METHOD AND SYSTEM FOR IMAGING AN EXTERNAL SCENE BY EMPLOYING A CUSTOM IMAGE SENSOR," the entire disclosure of which is hereby incorporated herein by reference.

FIELD OF THE INVENTION

The present disclosure generally relates to imaging sensors integrated into a vehicle, and in particular, to a method and system for imaging a scene external of the controlled vehicle.

BACKGROUND OF THE INVENTION

Imaging systems have become a popular feature in vehicles and are used in a variety of vehicular applications. One important application includes detecting the presence of other vehicles. To do so, some imaging systems detect the lights of other vehicles and may additionally categorize the light as either a headlamp or a taillight. However, one set back encountered by current imaging systems includes the difficulty of reliably imaging a taillight of another vehicle in certain conditions such as when the other vehicle is at a greater distance. As such, there is a need for an imaging system that provides more accurate taillight imaging.

SUMMARY OF THE INVENTION

According to an embodiment of the present invention, there is provided a method and system to image an external scene. The method includes filtering light received from the scene with a GRRB filter array integrated into the image sensor, generating image data corresponding to the filtered light, receiving and analyzing image data in a controller, and calculating a GRRB color metric to determine if the filtered light corresponds to one of a headlamp and a taillight of another vehicle.

In accordance with another embodiment of the invention, there is provided another method for imaging a scene external of a controlled vehicle. The method includes filtering light received from the scene with a GRRB filter array integrated into the image sensor, generating image data corresponding to the filtered light, and receiving and analyzing image data in a controller to detect lights of other vehicles.

In accordance with another embodiment of the invention, there is provided a system for controlling exterior lights of a controlled vehicle. The system includes an image sensor including a GRRB filter array for receiving light from a scene external and forward of the controlled vehicle and for generating image data representing the scene and, a controller for receiving and analyzing the image data to detect lights of other vehicles.

These and other features, advantages, and objects of the present invention will be further understood and appreciated by those skilled in the art by reference to the following specification, claims, and appended drawings.

DETAILED DESCRIPTION

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to methods and systems for imaging a scene external and forward of a controlled vehicle. An example of this is an exterior light control system for controlling exterior lights of a controlled vehicle in response to image data acquired from an image sensor, which captures images forward of the vehicle. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, as well as in U.S. patent application Ser. No. 13/432,250 entitled "VEHICULAR IMAGING SYSTEM AND METHOD FOR DETERMINING ROADWAY WIDTH" and filed on Mar. 28, 2012, by Jeremy A. Schut et al., the entire disclosures of which are incorporated herein by reference.

Such prior systems typically distinguish between headlamps and taillights so as to distinguish between oncoming and preceding vehicles. When detecting taillights at a distance, the taillights are typically not very bright and appear as very small dots of light on the image sensor—often being imaged onto only one or a few adjacent pixels. If the image sensor employs what is known as a Bayer array as its color filter, every block of four pixels is RGGB, or in other words, one of the four pixels is red, one is blue and two are green. Thus, if such a conventional Bayer array is used in a system for detecting taillights, the imaged dot of a distant taillight may only pass through to one of the RGGB pixels thereby only providing a 25% chance of fully illuminating a red pixel. When the imaged dot of a distant taillight does not strike a red pixel, its color cannot be readily identified as that of a taillight. Although the imaged dot will move across other pixels of the image sensor in subsequently captured image frames as the preceding vehicle moves relative to the controlled vehicle, improvements are possible over such image sensors using Bayer array filters so as to improve the likelihood that such a distant taillight can be detected in each image frame.

Figure 1:
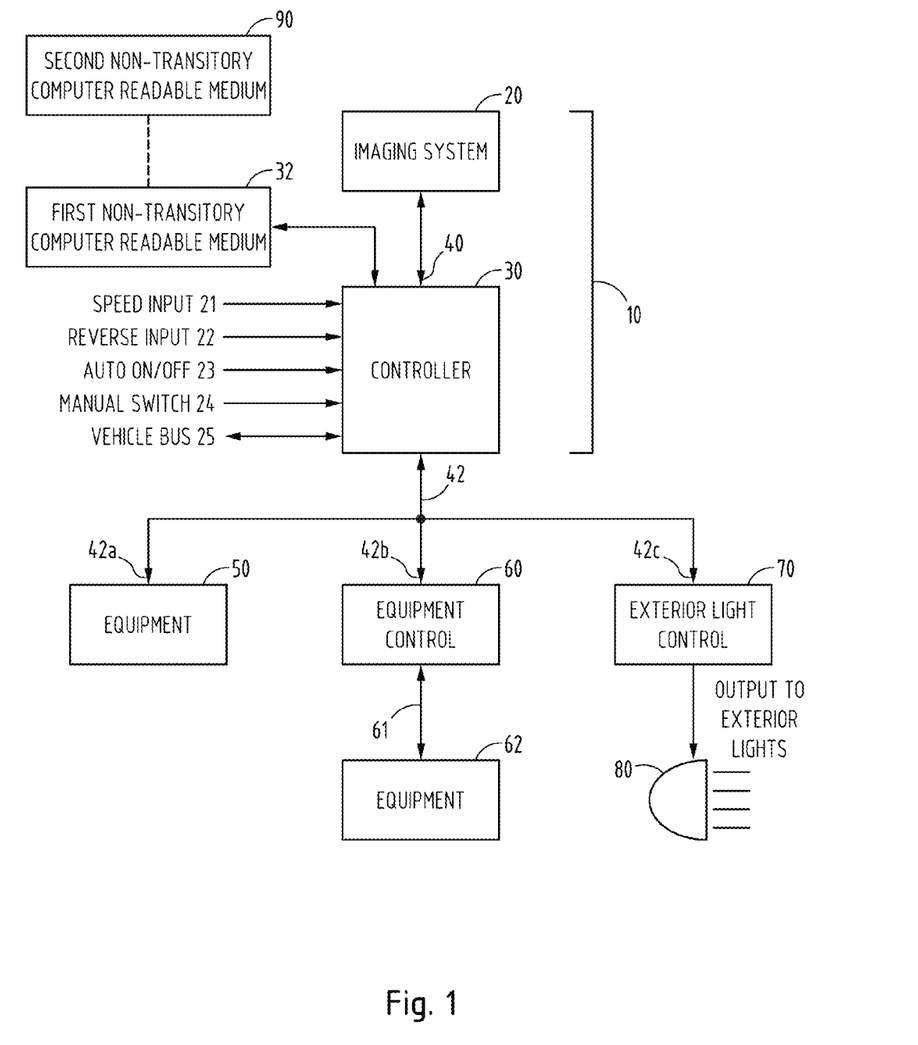
FIG. 1 is a block diagram of a system constructed according to one embodiment.

A first embodiment of an exterior light control system 10 is shown in FIG. 1. Exterior light control system 10 is provided for controlling exterior lights 80 and, optionally, other equipment (50, 62) of a controlled vehicle. System 10 includes a novel imaging system 20 and a controller 30. Imaging system 20 includes an image sensor (201, FIG. 2) that is configured to image a scene external and forward of the controlled vehicle and to generate image data corresponding to the acquired images. Controller 30 receives and analyzes the image data and generates an exterior light control signal that is used to control exterior lights 80 and may generate control signals to control any additional equipment (50, 62). These control signals are generated in response to analysis of the image data.

Controller 30 may be configured to directly connect to the equipment (50) being controlled such that the generated control signals directly control the equipment. Alternatively, controller 30 may be configured to connect to an equipment control (60 and 70), which, in turn, is connected to the equipment being controlled (62 and 80) such that the control signals generated by controller 30 only indirectly control the equipment. For example, in the case of the equipment being exterior lights 80, controller 30 may analyze the image data from imaging system 20 so as to generate control signals that are more of a recommendation for an exterior light control 70 to use when controlling exterior lights 80. The control signals may further include not just a recommendation, but also a code representing a reason for the recommendation so that equipment control 60 and 70 may determine whether or not to override a recommendation.

As shown in FIG. 1, various inputs (such as inputs 21-24) may be provided to controller 30 that may be taken into account in forming a recommendation or direct control signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow imaging system 20 to be located in the best location in the vehicle for obtaining images, which may be a distance from the equipment to be controlled and to allow communication over the vehicle bus 25.

According to one embodiment, the equipment that system 10 controls may include one or more exterior lights 80 and the control signal generated by controller 30 may be an exterior light control signal. In this embodiment, exterior lights 80 may be controlled directly by controller 30 or by an exterior light control 70, which receives a control signal from controller 30. As used herein, the "exterior lights" broadly includes any exterior lighting on the vehicle. Such exterior lights may include headlamps (both low and high beam if separate from one another), taillights, foul weather lights such as fog lights, brake lights, center-mounted stop lights (CHMSLs), turn signals, back-up lights, etc. The exterior lights may use a variety of lighting solutions such as light emitting diodes (LED), halogen, xenon, bi-xenon, LED matrix beam lighting, and LASER matrix beam lighting, and may be operated in several different modes including conventional low-beam and high-beam states. They may also be operated as daytime running lights, and additionally as super-bright high beams in those countries where they are permitted.

The exterior light brightness may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination array of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination array is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination array forward of the vehicle, or a combination of the above.

The imaging system 20 includes an image sensor (or camera), which is described further below, to capture images that may then be displayed and/or analyzed in order to control vehicle equipment in addition to exterior lights. For example, such imaging systems have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imaging systems for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., the entire disclosures of which are incorporated herein by reference.

In the example shown in FIG. 1, imaging system 20 may be controlled by controller 30. Communication of imaging system parameters as well as image data occurs over communication bus 40, which may be a bi-directional serial bus, parallel bus, a combination of both, or other suitable means. Controller 30 serves to perform equipment control functions by analyzing images from imaging system 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Controller 30 may control the imaging system to be activated in several different modes with different exposure times and different readout windows. Controller 30 may be used to both perform the equipment or exterior light control function and control the parameters of imaging system 20.

Controller 30 can also take advantage of the availability of signals (such as vehicle speed and yaw) communicated via discreet connections or over the vehicle bus 25 in making decisions regarding the operation of the exterior lights 80. In particular, speed input 21 provides vehicle speed information to the controller 30 from which speed can be a factor in determining the control state for the exterior lights 80 or other equipment. The reverse signal 22 informs controller 30 that the vehicle is in reverse, responsive to which the controller 30 may clear an electrochromic mirror element regardless of signals output from light sensors. Auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, windshield wiper input, wiper status input, turn signal input, back up status input, and/or headlamp status input can optionally be provided through vehicle bus 25 shown in FIG. 1. Alternatively, these inputs 21-24 may be provided to equipment control 60 or exterior light control 70.

Controller 30 can control, at least in part, other equipment 50 within the vehicle, which is connected to controller 30 via vehicle bus 42. Specifically, the following are some examples of one or more equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. The controller 30 may also use a second controller (or controllers), such as equipment control 60, which may be located in a rearview assembly or elsewhere in the vehicle, in order to control certain kinds of equipment 62. Equipment control 60 can be connected to receive via vehicle bus 42 control signals generated by controller 30. Equipment control 60 subsequently communicates and controls equipment 62 via bus 61. For example, equipment control 60 may be a windshield wiper control unit which controls windshield wiper equipment, turning this equipment ON or OFF. Equipment control 60 may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60, in communication with controller 30, may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry system, a telemetry system, a voice recognition system such as a digital signal processor-based voice actuation system, a vehicle speed control, interior lights, rearview mirrors, an audio system, a climate control, an engine control, and various other switches and other display devices that may be located throughout the vehicle.

Figure 2:
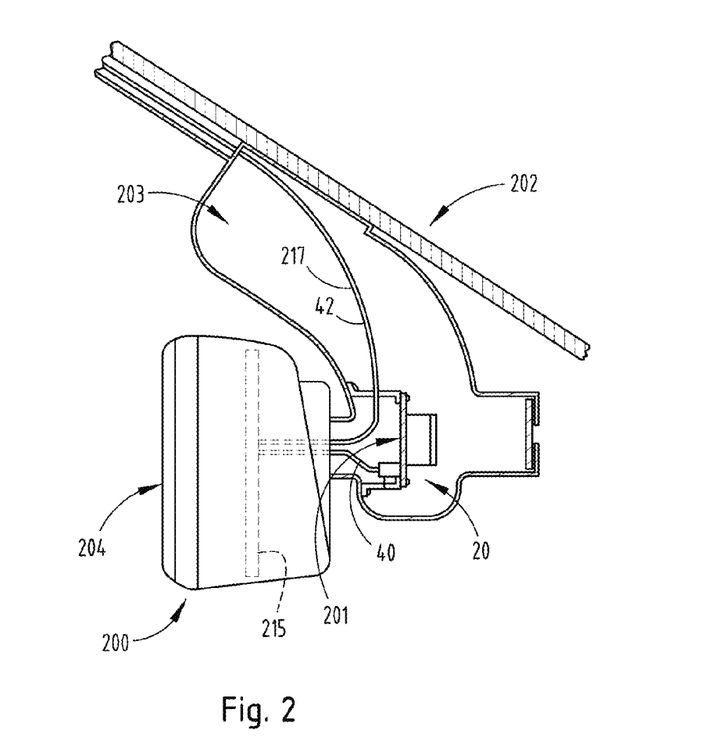
FIG. 2 is a partial cross section of a rearview assembly incorporating a system in accordance with another embodiment.

Portions of system 10 can be advantageously integrated into a rearview assembly 200 as illustrated in FIG. 2, wherein imaging system 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imaging system 20 in the rearview assembly permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor with the exception of an aperture through which light is received from a forward external scene.

Controller 30 of FIG. 1 may be provided on a main circuit board 215 and mounted in rearview housing 204 as shown in FIG. 2. As discussed above, controller 30 may be connected to imaging system 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

Figure 3:
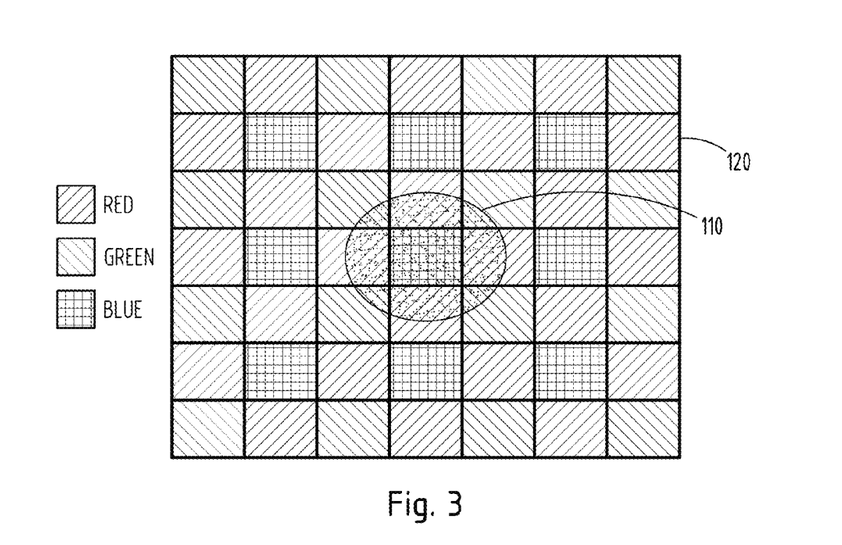
FIG. 3 is a pictorial representation of a detected taillight on a GRRB filter array which serves to image a scene external and forward of a controlled vehicle, in accordance with one embodiment of the present invention.

FIG. 3 shows a pictorial representation of a detected taillight 110 on a GRRB filter 120, which serves to image a scene external and forward of a controlled vehicle. As shown in FIG. 3, in order to image a taillight, a large portion of the taillight 110 preferably strikes a plurality of red pixels, as any light detected by the green or blue pixels are filtered out. Typically vehicles move within the scene captured by the image sensor in four directions: up, down, left and right as the vehicle approaches so that the light peaks of its lights can randomly strike different pixels on the filter array, allowing for more accurate attributes of the object. In addition, if used for lane detection, a GRRB filter may provide an increase in contrast between the lane markings and surrounding objects. Relative to an RGGB Bayer filter, an image sensor with a GRRB filter is more sensitive to red light being present in the scene, which allows for increased imaging accuracy of taillights since as the taillight moves up, down, left or right, the peak of the taillight will be imaged on more red pixels with a smaller portion of the light being filtered out by green and blue pixels. In addition, if the taillight moves in a diagonal fashion, it will still strike approximately four red pixels, reliably imaging the taillight.

A GRRB color metric may be calculated to allow a GRRB filter to resolve "red" and "non-red" lights at least equally well as an RGGB Bayer filter. The GRRB filter and GRRB color metric may be employed in imaging systems that image a scene forward of a controlled vehicle as well as imaging systems that image a scene to the rear of a controlled vehicle such as a backup camera. In either embodiment, the use of a GRRB filter makes the image sensor more sensitive to red light as previously described, which enables an imaging system to more reliably detect taillights but also enables more reliable imaging when red light from other sources pervade the scene. For example, when a controlled vehicle is backing up, the rear scene is illuminated by the controlled vehicle's own taillights. By using a backup camera with a GRRB filter and adopting the GRRB color metric described herein, objects in the rear scene may be more reliably imaged and displayed on an associated display screen, thus providing a driver with a better view of the imaged area while performing a backup maneuver.

The GRRB color metric is based on the way in which standard displays interpret and display color information, thereby capturing information about overall light much in the same way that a video display would. This may be achieved by:

1) Performing bilinear interpolation around a 5×5 filter area surrounding each of the pixels where a light maximum/peak fell on, called a "peak pixel."

2) Summing each of the color channels of the interpolated 5×5 area to obtain a red, green, and blue brightness value for the light.

3) Normalizing the color channel brightness to overall brightness of the light: red brightness divided by the sum of red, green and blue brightness; green brightness divided by the sum of red, green and blue brightness; blue brightness divided by the sum of the red, green and blue brightness.

Figure 4:
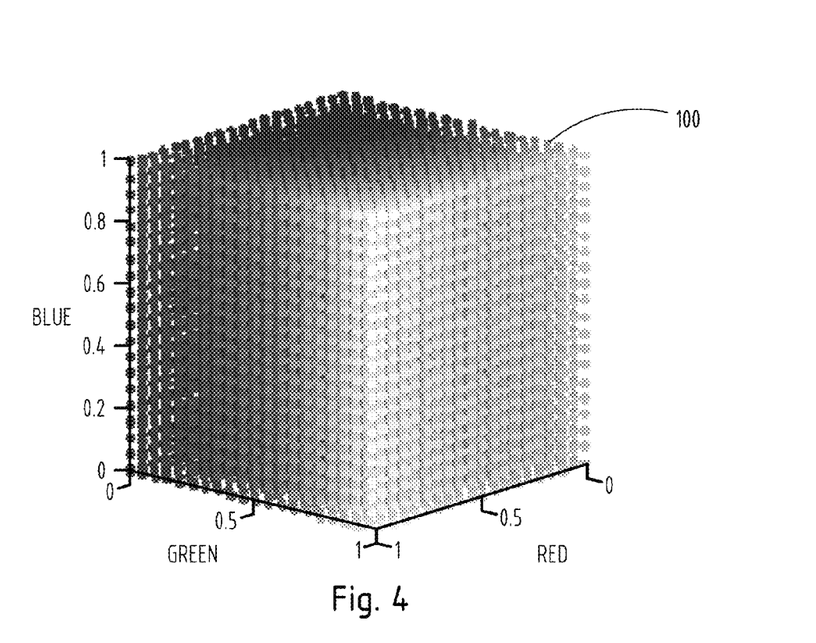
FIG. 4 is a pictorial representation of a three-dimensional color cube used to convert red, green and blue 3-D scale to a linear scale of non-red to red, in accordance with one embodiment of the present invention.

Following normalization of energy for each of the three color channels, conversion of the red, green and blue three-dimensional scale to a linear scale of non-red to red may be performed. FIG. 4 shows an example of a pictorial representation of a three-dimensional RGB color cube 100 used to convert red, green and blue 3-D scale to a linear scale of non-red to red. For example, the color displayed on an LCD screen depends on the location of the red, green and blue pixels and where it falls in the cube presented in FIG. 4. A similar concept may be applied to the calculated color metric of the present embodiment except for at least one caveat. While the maximum value for an individual color channel for an 8-bit display would be known (i.e. maximum is 255), the absolute maximum value of a specific light's color channel may be unknown in the present invention. Instead of evaluating the exact color of a light, calculation of the light's color relative to an expectation of a red light may be employed.

Figure 5:
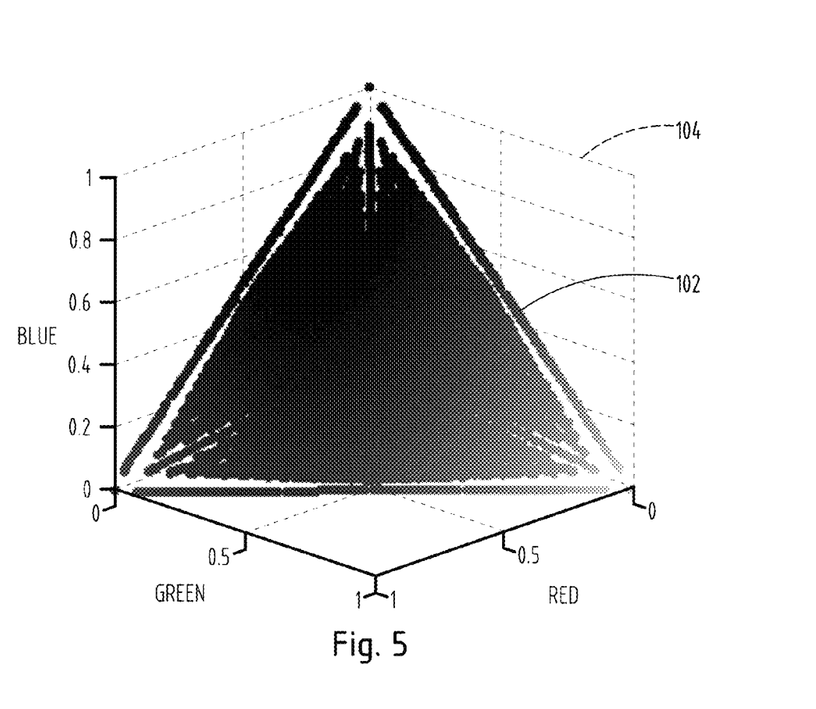
FIG. 5 is a pictorial representation of evaluating color by a 3-D color plane which cuts through a 3-D color cube, in accordance with one embodiment of the present invention.

FIG. 5 shows an example of evaluating color by a color plane 102, which cuts through an RGB color cube 104 as part of the process to calculate light's color relative to an expectation of red light. By normalizing the individual color channels to an overall brightness value of light, the red, green, and blue brightness values may be mapped onto the color plane to define a color area, such as color area 108 shown in FIG. 7. Once this has been done, a relationship between the red, green, and blue normalized values and expected value of a "red" light (R=1, B=0, G=0) can be defined. Next, the difference between an expected value of "red" and the normalized red, green and blue values of a light is calculated for a specified number of points in and inclusive of the boundary edges of the color area 108. The above-described process is defined by the following mathematical equation:

$$\text{COLOR} = R + (1-G) + (1-B) \tag{1}$$

Figure 6:
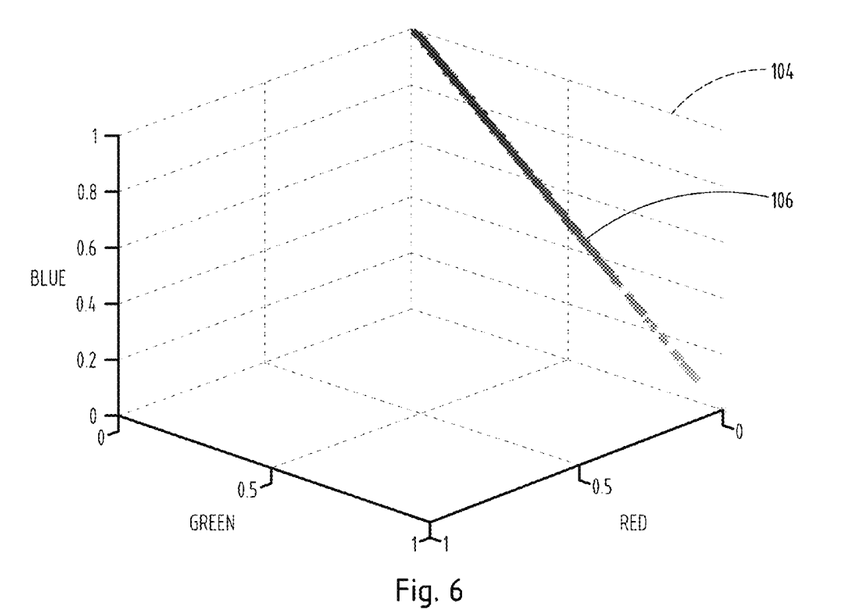
FIG. 6 is a pictorial representation of a most non-red color line that occurs along an edge of a 3-D color plane, in accordance with one embodiment of the present invention.
Figure 7:
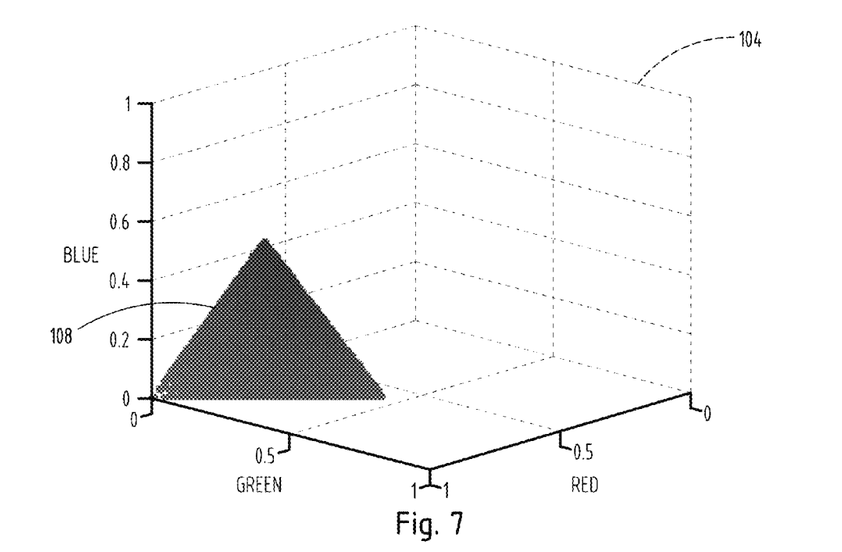
FIG. 7 is a pictorial representation of an area of a 3-D color plane which will be evaluated as taillights, in accordance with one embodiment of the present invention.

The above-defined mathematical equation may be applied to any point in and inclusive of the boundary edges of the color area 108. From equation (1), it can be seen that the red value (R) is left as is while the green (G) and blue values (B) are subtracted from one so that a higher value on the redness scale can be achieved for each of the green and blue values. Then the three values may be summed to produce a scale where 0="most non-red" and 3="most red." Thus, the "most red light" occurs where R=1, G=0 and B=0, which yields a COLOR value of 3, and the "most non-red" light occurs where R=0, G=1, and B=1, which yields a COLOR value of 0. However, since the intersection of the RGB color cube 104 and the color plane 102 forms an equilateral triangle where each corner of the color plane 102 falls on the "most red" (R=1, G=0, B=0), "most green" (R=0, G=1, B=0), and "most blue" (R=0, G=0, B=1) coordinates, it is possible that the "most non-red" light may fall on the edge of the triangle opposite the "most red" corner. As a result, the COLOR value for any point along this line equals 1, so in actuality the range of redness is from 1 to 3 where 1 is the "most non-red" light and 3 is the "most red." FIG. 6 shows an example of where a line 106 of "most non-red" occurs with respect to the color cube 104 of the present embodiment. In any event, once the COLOR values have been calculated for a specified number of points of a color area, the COLOR values may be summed to obtain a TOTAL COLOR value, which may then be compared to a color threshold to determine if the color area is that of a taillight or a headlamp. When using the GRRB light metric described herein, the TOTAL COLOR value for a taillight is typically greater than that of a headlamp. As such, the color threshold may be chosen such that the color area is deemed a taillight if the TOTAL COLOR is greater than the color threshold. Conversely, if the TOTAL COLOR is less than or equal to the color threshold, the color area may be deemed a headlamp. FIG. 7 shows an example of a color area 108 of the color plane 102 that may be evaluated as taillights.

Figure 8A:
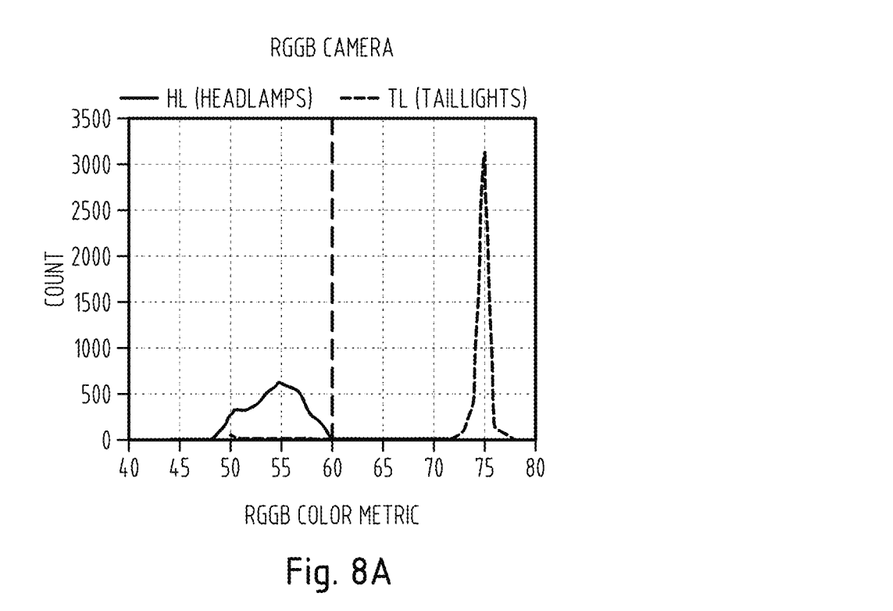
FIG. 8A is a graphic illustration of crossover between headlamps and taillights when using an RGGB camera, which has an RGGB filter array and employs an RGGB color metric.
Figure 8B:
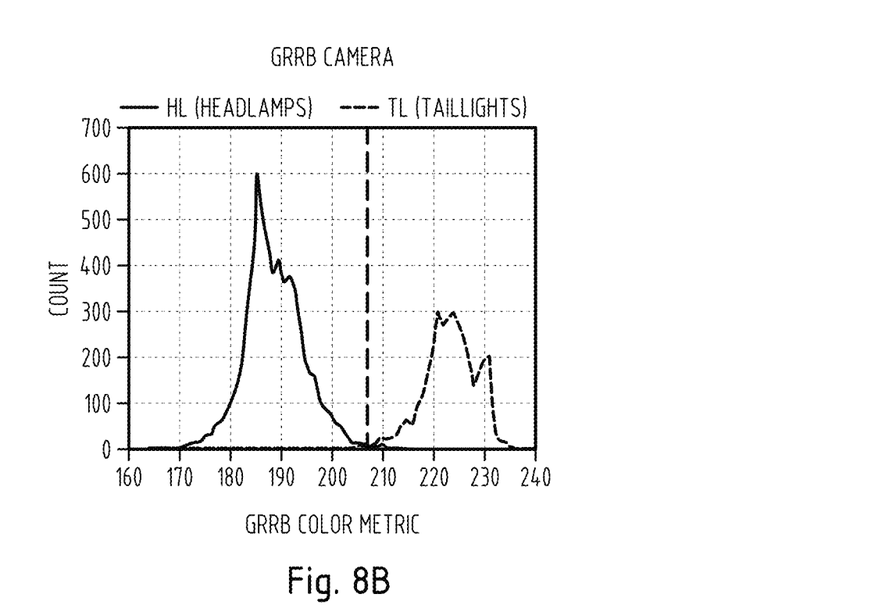
FIG. 8B is a graphic illustration of crossover between headlamps and taillights when using a GRRB camera, which has a GRRB filter array and employs a GRRB color metric, in accordance with one embodiment of the present invention.

The GRRB color filter implementation of the present invention offers various improvements to automatic vehicle equipment control systems. FIGS. 8A and 8B illustrate an improvement on crossover reduction between headlamps and taillights when using a GRRB color metric. Crossover can be measured by the amount of overlap between headlamps and taillights detected in a given time frame. Regarding FIGS. 8A and 8B, a side-by-side test was performed where a camera outfitted with an RGGB image sensor and a camera outfitted with a GRRB image sensor were mounted next to one another to simultaneously image the same scenes. The camera with the RGGB image sensor employed a conventional RGGB light metric while the camera with the GRRB image sensor employed the GRRB light metric described previously herein. Crossover data was collected for each camera and is shown in FIGS. 8A and 8B, respectively. With respect to the data shown in FIGS. 8A and 8B, the crossover for the RGGB camera was calculated to be approximately 2.101% while the crossover for the GRRB camera was calculated to be approximately 1.370%. Thus, given the results from the abovementioned test, the lower crossover encountered by the GRRB camera indicates that the use of a GRRB filter array and GRRB light metric such those described herein may provide greater accuracy in the detection of taillights and headlamps.

Figure 9A:
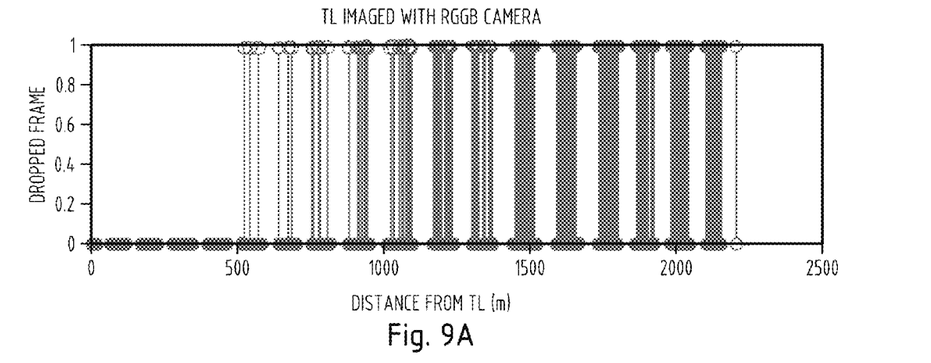
FIG. 9A is a graphic illustration of light drop out when using the RGGB camera.
Figure 9B:
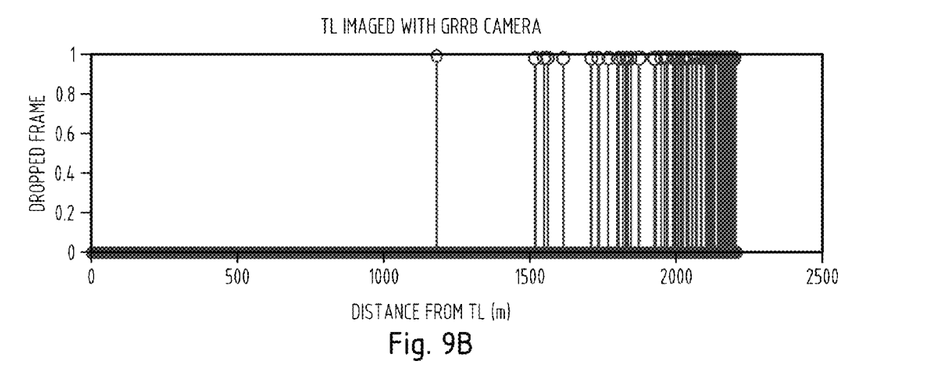
FIG. 9B is a graphic illustration of light drop out when using the GRRB camera.
Figure 9C:
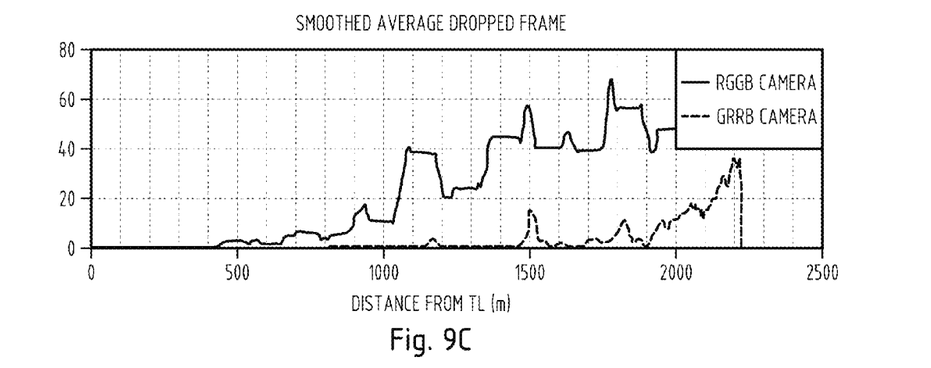
FIG. 9C is a graphic illustration of a running average of the number of dropped frames for the RGGB camera and the GRRB camera.

From the abovementioned side-by-side test, an improvement in light drop out was also observed. Light drop out is the percentage of frames not detected due to failing to detect a particular light source because of low brightness or insufficient redness in color or if the light source is on the edge of the image. The light drop out for a taillight imaged with the RGGB camera is shown in FIG. 9A whereas the light drop out for the same taillight imaged with the GRRB camera is shown in FIG. 9B. As shown in FIG. 9C, a running average of the number of dropped frames is typically at least two times less using a GRRB filer array than an RGGB filter array. Based on the results from the previously described side-by-side test, the GRRB filter can image a taillight with equivalent dropout to the RGGB, but at twice the distance.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A method for imaging a scene external and forward of a controlled vehicle, comprising:
    filtering light received from the scene with a color filter array operably coupled to an image sensor;
    generating image data corresponding to the filtered light; and
    analyzing the image data in a controller, the analyzing comprising:
        obtaining a red brightness value, a green brightness value, and a blue brightness value of the filtered light;
        mapping the red, green, and blue brightness values onto a color area of a color lane that intersects an RGB color cube;
        determining a redness value of one or more specified points on the color area;
        summing each redness value to determine a total redness value; and
        comparing the total redness value to a threshold to determine if the filtered light is one of a headlamp and a taillight of another vehicle.

2. The method of claim 1, wherein analyzing the image rises interpolating a number of color channels in an area surrounding a peak pixel to obtain the red brightness value, the green brightness value, and the blue brightness value.

3. The method of claim 2, wherein analyzing the image data further comprises summing the red brightness value, the green brightness value, and the blue brightness value to obtain an overall brightness content of the light.

4. The method of claim 3, wherein analyzing the image data further comprises normalizing the red brightness value, the green brightness value, and the blue brightness value to the overall brightness content of the light.

5. The method of claim 1, wherein the color plane comprises a linear scale of non-red to red.

6. A method for imaging a scene external and forward of a controlled vehicle, comprising:
    filtering light received from the scene with a GRRB filter array operably coupled to an image sensor;
    generating image data corresponding to the filtered light; and
    analyzing the image data in a controller, the analyzing comprising:
        obtaining a red brightness value, a green brightness value, and a blue brightness value of the filtered light;
        mapping the red, green, and blue brightness values onto a color plane that intersects an RGB color cube, wherein the color plane has a linear scale of non-red to red;
        determining a redness value of one or more specified points on a color area of the color plane, wherein the redness value is based on a relationship between the red, green, and blue brightness values and an expected value of red;
        summing each redness value to determine a total redness value; and
        comparing the total redness value to a threshold to determine if the filtered light is one of a headlamp and a taillight of another vehicle.

7. The method of claim 6, wherein analyzing the image data further comprises interpolating a number of color channels in an area surrounding a peak pixel to obtain the red brightness value, the green brightness value, and the blue brightness value.

8. The method of claim 7, wherein analyzing the image data further comprises summing the red brightness value, the green brightness value, and the blue brightness value to obtain an overall brightness content of the light.

9. The method of claim 8, wherein analyzing the image data further comprises normalizing the red brightness value, the green brightness value, and the blue brightness value to the overall brightness content of the light.

10. A system for imaging a scene external of a controlled vehicle, the system comprising:
- an image sensor including a color filter array for receiving light from the scene and for generating image data representing the scene; and
- a controller for analyzing the image data, the controller configured to:
  - obtain a red brightness value, a green brightness value, and a blue brightness value of the filtered light;
  - map the red, green, and blue brightness values onto a color area of a color plane that intersects an RGB color cube;
  - determine a redness value of one or more specified points on the color area;
  - sum each redness value to determine a total redness value; and
  - compare the total redness value to a threshold to determine if the filtered light is one of a headlamp and a taillight of another vehicle.

11. The method of claim 1, wherein the color filter array comprises a GRRB filter array.

12. The method of claim 1, wherein the color plane comprises an equilateral triangle.

13. The method of claim 1, wherein analyzing the image data further comprises determining the redness value of a specified point on the color area by computing the following equation:

$$COLOR = R + (1-G) + (1-B),$$

where COLOR is the redness value, R is a red value of the specified point, G is a green value of the specified point, and B is a blue value of the specified point.

14. The method of claim 6, wherein the color plane comprises an equilateral triangle.

15. The method of claim 6, wherein analyzing the image data further comprises determining the redness value of a specified point on the color area by computing the following equation:

$$COLOR = R + (1-G) + (1-B),$$

where COLOR is the redness value, R is a red value of the specified point, G is a green value of the specified point, and B is a blue value of the specified point.

16. The system of claim 10, wherein the color filter array comprises a GRRB filter array.

17. The system of claim 10, wherein the color plane comprises a linear scale of non-red to red.

18. The system of claim 10, wherein the controller normalizes the red brightness value, the green brightness value, and the blue brightness value to an overall brightness content of the light.

19. The system of claim 10, wherein the color plane comprises an equilateral triangle.

20. The system of claim 10, wherein the controller determines the redness value of a specified point on the color area by computing the following equation:

$$COLOR = R + (1-G) + (1-B),$$

where COLOR is the redness value, R is a red value of the specified point, G is a green value of the specified point, and B is a blue value of the specified point.

* * * * *

UNITED STATES PATENT AND TRADEMARK OFFICE
CERTIFICATE OF CORRECTION

PATENT NO. : 9,511,708 B2  
APPLICATION NO. : 13/967933  
DATED : December 6, 2016  
INVENTOR(S) : Wright et al.

Page 1 of 1

It is certified that error appears in the above-identified patent and that said Letters Patent is hereby corrected as shown below:

In the Claims

Column 10, Claim 1, Line 7:
"lane" should be --plane--;

Column 10, Claim 2, Lines 16-17:
"image rises" should be --image data further comprises--.

Signed and Sealed this
Twenty-eighth Day of February, 2017

Michelle K. Lee
*Director of the United States Patent and Trademark Office*